(12) United States Patent
Wentink et al.

(10) Patent No.: US 9,462,465 B2
(45) Date of Patent: Oct. 4, 2016

(54) APPARATUS AND METHODS FOR SEPARATED SECURITY IMPLEMENTATIONS IN WIRELESS COMMUNICATIONS

(71) Applicant: QUALCOMM Incorporated, San Diego, CA (US)

(72) Inventors: Maarten Menzo Wentink, Naarden (NL); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 14/504,282

(22) Filed: Oct. 1, 2014

(65) Prior Publication Data

US 2015/0098570 A1   Apr. 9, 2015

Related U.S. Application Data

(60) Provisional application No. 61/887,223, filed on Oct. 4, 2013.

(51) Int. Cl.
*H04W 12/04* (2009.01)
*H04L 29/08* (2006.01)
(Continued)

(52) U.S. Cl.
CPC .......... *H04W 12/04* (2013.01); *H04L 61/6022* (2013.01); *H04L 63/12* (2013.01); *H04L 63/14* (2013.01); *H04L 69/322* (2013.01);
(Continued)

(58) Field of Classification Search
None
See application file for complete search history.

(56) References Cited

U.S. PATENT DOCUMENTS 6,826,613 B1 * 11/2004 Wang .................... G06F 3/0607
                                                                  709/202
8,392,509 B1 *  3/2013 Klessig ............... H04L 41/0803
                                                                  370/419

(Continued)

FOREIGN PATENT DOCUMENTS

WO    WO-2012159082 A2    11/2012

OTHER PUBLICATIONS

IEEE std.802.11i,"IEEE Standard for Information technology—Telecommunications and information exchange between systems—Local and metropolitan area networks—Specific requirements Part 11: Wireless LAN Medium Access Control (MAC) and Physical Layer (PHY) specifications, Amendment 6: Medium Access Control (MAC) Security Enhancements", IEEE Standard, IEEE, Piscataway, NJ, USA, Jul. 23, 2004, XP017601578, pp. 1-195, ISBN: 978-0-7381-4073-5.

(Continued)

*Primary Examiner* — Hadi Armouche
*Assistant Examiner* — Malcolm Cribbs
(74) *Attorney, Agent, or Firm* — Knobbe, Martens, Olson & Bear, LLP

(57) ABSTRACT

Systems, methods, and devices for communicating MPDUs having a plurality of types are described herein. One aspect of the disclosure provides a method of processing a media access control (MAC) protocol data unit (MPDU) in a wireless system. The method includes receiving the MAC protocol data unit, the MAC protocol data unit comprising an indication of a communication in accordance with a protocol version. The method further includes selecting a replay counter from one of a first and second sets of replay counters based at least in part on the indication. The method further includes processing the received MAC protocol data unit in accordance with the selected replay counter.

27 Claims, 9 Drawing Sheets

(51) Int. Cl.
*H04L 29/06* (2006.01)
*H04W 12/12* (2009.01)
*H04W 28/06* (2009.01)
*H04L 29/12* (2006.01)

(52) U.S. Cl.
CPC ........... *H04W 12/12* (2013.01); *H04W 28/06* (2013.01); *H04L 2463/061* (2013.01)

(56) References Cited

U.S. PATENT DOCUMENTS

| | | | | |
|---|---|---|---|---|
| 2004/0048625 A1* | 3/2004 | Papoutsis | ............... | H04W 48/12 455/458 |
| 2007/0104203 A1* | 5/2007 | Sood | ................ | H04L 63/14 370/394 |
| 2009/0044276 A1* | 2/2009 | Abdel-Aziz | .......... | H04L 63/145 726/24 |
| 2010/0111308 A1* | 5/2010 | Forsberg | ............... | H04L 63/061 380/278 |
| 2010/0161980 A1* | 6/2010 | Sood | ................ | G06F 21/73 713/168 |
| 2011/0055558 A1* | 3/2011 | Liu | ................ | H04L 9/0637 713/160 |
| 2011/0080873 A1* | 4/2011 | Zhang | ................ | H04W 12/02 370/328 |
| 2011/0197278 A1* | 8/2011 | Chow | ................ | H04L 63/1458 726/24 |
| 2011/0199953 A1* | 8/2011 | Seok | ................ | H04W 4/06 370/312 |
| 2012/0047573 A1* | 2/2012 | Duncan | ............. | H04L 29/12915 726/13 |
| 2013/0014267 A1* | 1/2013 | Farrugia | ................ | G06F 21/14 726/26 |
| 2014/0321449 A1* | 10/2014 | Dong | ................ | H04L 61/6072 370/338 |

OTHER PUBLICATIONS

International Search Report and Written Opinion—PCT/US2014/058831—ISA/EPO—Jul. 15, 2015.

* cited by examiner

| Field Name | Size in Octets | Field Description | |
|---|---|---|---|
| fc | 2 | frame control | 305a |
| dur | 2 | duration/id | 310a |
| a1 | 6 | receiver address | 315a |
| a2 | 6 | transmitter address | 320a |
| a3 | 6 | destination address | 325a |
| sc | 2 | sequence control | 330a |
| qc | 2 | quality of service control | 335a |
| htc | 4 | High throughput control | 340a |
| ccmp | 8 | counter-mode/cbc-mac protocol | 345a |
| llc/snap | 8 | logical link control/subnetwork access protocol | 350a |
| mic | 8 | message integrity check | 360a |
| fcs | 4 | frame control sequence | 365a |
| TOTAL SIZE: | 58 | | |

| Field Name | Size in Bits | Field Description | |
|---|---|---|---|
| pv | 2 | protocol version | 372 |
| type | 2 | frame type | 374 |
| subtype | 4 | frame subtype | 376 |
| to-ds | 1 | to distribution system | 378 |
| from-ds | 1 | from distribution system | 380 |
| more frag | 1 | more fragments | 382 |
| retry | 1 | retry | 384 |
| pm | 1 | power management | 386 |
| md | 1 | more data | 388 |
| pf | 1 | protected frame | 390 |
| order | 1 | order | 392 |
| TOTAL SIZE: | 16 | | |

FIG. 3A

| Direction | To-DS/ From-DS | Data | | | ACK |
| | | A1 (Rx) | A2 (Tx) | A3 (SA/DA) | A1 (Rx) |
|---|---|---|---|---|---|
| DL | 01 | AID | BSSID | (SA) | pBSSID |
| UL | 10 | BSSID | AID | (DA) | AID |
| Direct | 00 | RA | AID |  | AID |

APPARATUS AND METHODS FOR SEPARATED SECURITY IMPLEMENTATIONS IN WIRELESS COMMUNICATIONS

CROSS-REFERENCE TO RELATED APPLICATIONS

This application claims priority to U.S. Provisional Patent Application No. 61/887,223, entitled "APPARATUS AND METHODS FOR SEPARATED SECURITY IMPLEMENTATIONS IN WIRELESS COMMUNICATIONS," and filed Oct. 4, 2013, the entirety of which is incorporated herein by reference.

FIELD

The present application relates generally to wireless communications, and more specifically to systems, methods, and devices for secure communications in wireless communications systems.

BACKGROUND

In many telecommunication systems, communications networks are used to exchange messages among several interacting spatially-separated devices. Networks can be classified according to geographic scope, which may be, for example, a metropolitan area, a local area, or a personal area. Such networks may be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network can transmit/receive information between each other. The information can comprise all or a portion of one or more media access control (e.g., MAC) protocol data units (MPDUs). The MPDUs can comprise packets, frames, segments, messages, etc., which in some aspects can be referred to as data units, data packets, and/or data frames. The data units, data packets, and/or data frames can be aggregated. The MPDUs can further include overhead information (e.g., header information, packet properties, etc.) that may help in routing the MPDU through the network, identifying the data in the MPDU, securing the data in the MPDU, processing the MPDU, etc. The MPDUs can also include data, for example, user data, multimedia content, etc., as might be carried in a payload of the MPDU.

Accordingly, the header information is transmitted with MPDUs. Such header information can comprise different information for complying with communications in different protocol versions. Header information in some protocol versions may not be compatible with header information in other protocol versions. Thus, improved systems, methods, and devices for secure communications are desired.

SUMMARY

The systems, methods, and devices of the invention each have several aspects, no single one of which is solely responsible for its desirable attributes. Without limiting the scope of this invention as expressed by the claims which follow, some features will now be described briefly. After considering this discussion, and particularly after reading the section entitled "Detailed Description," one will understand how the features of this invention provide advantages that include secure communications in wireless communications systems.

One aspect of the disclosure provides a method of processing a MAC protocol data unit (MPDU) in a wireless system. The method includes receiving the MAC protocol data unit, the MAC protocol data unit comprising an indication of a communication in accordance with a protocol version. The method further includes selecting a replay counter from one of a first and second sets of replay counters based at least in part on the indication. The method further includes processing the received MAC protocol data unit in accordance with the selected replay counter.

In various embodiments, the first and second sets of replay counters can each include one replay counter per traffic indicator and per transmitter address. In various embodiments, processing the received MAC protocol data unit in accordance with the selected replay counter can include selectively discarding the MPDU based on whether a packet number of the MPDU is less than or equal to a value maintained at the replay counter.

In various embodiments, the method can further include maintaining the first and second sets of replay counters associated with communication in accordance with a first and second protocol version, respectively. The MPDU can include a first security header having a first length when the protocol version indication indicates the first protocol version. The MPDU can include a second security header having a second length, smaller than the first length, when the protocol version indication indicates the second protocol version.

In various embodiments, the method can further include generating, based on the received MPDU, a nonce comprising the indication of the communication in accordance with the protocol version. In various embodiments, the nonce can include one or more of: a four-bit priority field, a one-bit management field, a one-bit protocol indication flag, a six-byte transmitter address field, and a six-byte packet number field. In various embodiments, the one-bit protocol indication flag can indicate a particular protocol version when set.

In various embodiments, the method can further include deriving a first encryption key associated with communication in accordance with the first protocol version and a second encryption key associated with communication in accordance with the second protocol version. In various embodiments, the method can further include decoding a portion of the MPDU using the first encryption key when the protocol version indication indicates the first protocol version. The method can further include decoding a portion of the MPDU using the second encryption key when the protocol version indication indicates the second protocol version. In various embodiments, the first and second encryption keys can include temporal keys.

Another aspect provides a wireless device configured to receive an MPDU in a wireless system. The device further includes a receiver configured to receive the MAC protocol data unit, the MAC protocol data unit comprising an indication of a communication in accordance with a protocol version. The device further includes a processor configured to select a replay counter from one of a first and second sets of replay counters based at least in part on the indication. The processor is further configured to process the received MAC protocol data unit in accordance with the selected replay counter.

In various embodiments, the first and second sets of replay counters can each include one replay counter per traffic indicator and per transmitter address. In various embodiments, the processor can be configured to process the received MAC protocol data unit by selectively discarding the MAC protocol data unit based on whether a packet number of the MAC protocol data unit is less than or equal to a value maintained at the selected replay counter.

In various embodiments, the device further includes a memory configured to maintain the first and second sets of replay counters associated with communication in accordance with a first and second protocol version, respectively. The MPDU can include a first security header having a first length when the protocol version indication indicates the first protocol version. The MPDU can include a second security header having a second length, smaller than the first length, when the protocol version indication indicates the second protocol version.

In various embodiments, the processor can be further configured to generate, based on the received MPDU, a nonce comprising the indication of the communication in accordance with the protocol version. In various embodiments, the nonce can include one or more of: a four-bit priority field, a one-bit management field, a one-bit protocol indication flag, a six-byte transmitter address field, and a six-byte packet number field. In various embodiments, the one-bit protocol indication flag can indicate a particular protocol version when set.

In various embodiments, the processor can be further configured to derive a first encryption key associated with communication in accordance with the first protocol version and a second encryption key associated with communication in accordance with the second protocol version. In various embodiments, the processor can be further configured to decode a portion of the MPDU using the first encryption key when the protocol version indication indicates the first protocol version. The processor can be further configured to decode a portion of the MPDU using the second encryption key when the protocol version indication indicates the second protocol version. In various embodiments, the first and second encryption keys can include temporal keys.

Another aspect provides an apparatus for processing an MPDU in a wireless system. The apparatus includes means for receiving the MAC protocol data unit, the MAC protocol data unit comprising an indication of a communication in accordance with a protocol version. The apparatus further includes means for selecting a replay counter from one of a first and second sets of replay counters based at least in part on the indication. The apparatus further includes means for processing the received MAC protocol data unit in accordance with the selected replay counter.

In various embodiments, the first and second sets of replay counters can each include one replay counter per traffic indicator and per transmitter address. In various embodiments, means for processing the received MAC protocol data unit in accordance with the selected replay counter can include means for selectively discarding the MAC protocol data unit based on whether a packet number of the MAC protocol data unit is less than or equal to a value maintained at the selected replay counter.

In various embodiments, the MPDU can include a first security header having a first length when the protocol version indication indicates the first protocol version. The MPDU can include a second security header having a second length, smaller than the first length, when the protocol version indication indicates the second protocol version.

In various embodiments, the apparatus can further include means for generating, based on the received MPDU, nonce comprising the indication of the communication in accordance with the protocol version. In various embodiments, the nonce can include one or more of: a four-bit priority field, a one-bit management field, a one-bit protocol indication flag, a six-byte transmitter address field, and a six-byte packet number field. In various embodiments, the one-bit protocol indication flag can indicate a particular protocol version when set.

In various embodiments, the apparatus can further include means for deriving a first encryption key associated with communication in accordance with the first protocol version and a second encryption key associated with communication in accordance with the second protocol version. In various embodiments, the apparatus can further include means for decoding a portion of the MPDU using the first encryption key when the protocol version indication indicates the first protocol version. The apparatus can further include means for decoding a portion of the MPDU using the second encryption key when the protocol version indication indicates the second protocol version. In various embodiments, the first and second encryption keys can include temporal keys.

Another aspect provides a non-transitory computer-readable medium. The medium includes code that, when executed by one or more processors, causes an apparatus to receive a MAC protocol data unit, the MAC protocol data unit comprising an indication of a communication in accordance with a protocol version. The medium further includes code that, when executed, causes the apparatus to select a replay counter from one of a first and second sets of replay counters based at least in part on the indication. The medium further includes code that, when executed, causes the apparatus to process the received MAC protocol data unit in accordance with the selected replay counter.

In various embodiments, the first and second sets of replay counters can each include one replay counter per traffic indicator and per transmitter address. In various embodiments, processing the received MAC protocol data unit in accordance with the selected replay counter can include selectively discarding the MAC protocol data unit based on whether a packet number of the MAC protocol data unit is less than or equal to a value maintained at the selected replay counter.

In various embodiments, the MPDU can include a first security header having a first length when the protocol version indication indicates the first protocol version. The MPDU can include a second security header having a second length, smaller than the first length, when the protocol version indication indicates the second protocol version.

In various embodiments, the medium can further include code that, when executed, causes the apparatus to generate, based on the received MPDU, a nonce comprising the indication of the communication in accordance with the protocol version. In various embodiments, the nonce can include one or more of: a four-bit priority field, a one-bit management field, a one-bit protocol indication flag, a six-byte transmitter address field, and a six-byte packet number field. In various embodiments, the one-bit protocol indication flag can indicate a particular protocol version when set.

In various embodiments, the medium can further include code that, when executed, causes the apparatus to derive a first encryption key associated with communication in accordance with the first protocol version and a second encryption key associated with communication in accordance with the second protocol version. In various embodiments, the medium can further include code that, when executed, causes the apparatus to decode a portion of the MPDU using the first encryption key when the protocol version indication indicates the first protocol version. The medium can further include code that, when executed, causes the apparatus to decode a portion of the MPDU using the second encryption key when the protocol version indication indicates the second protocol version. In various embodiments, the first and second encryption keys can include temporal keys.

BRIEF DESCRIPTION OF THE DRAWINGS

FIG. 3A illustrates an example of contents of a medium access control (MAC) header.

DETAILED DESCRIPTION

Figure 1:
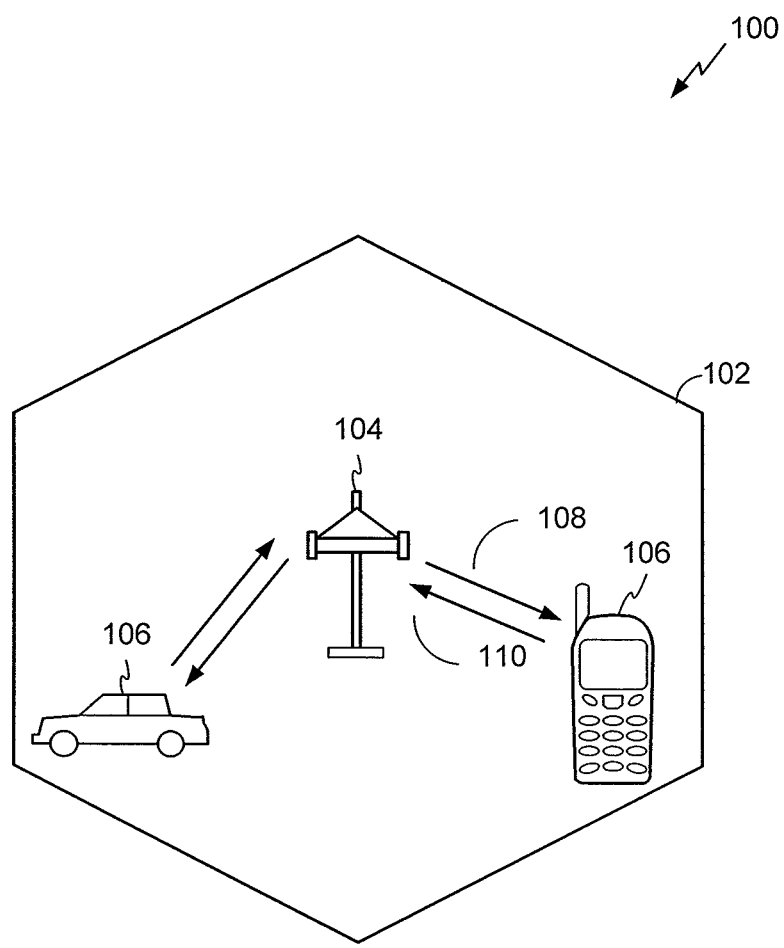
FIG. 1 illustrates an example of a wireless communication system in which aspects of the present disclosure can be employed.

Various aspects of the novel systems, apparatuses, and methods are described more fully hereinafter with reference to the accompanying drawings. The teachings disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. The scope of the disclosure covers any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention covers such an apparatus or method which is practiced using other structure, functionality, or structure and functionality in addition to or other than the various aspects of the invention set forth herein. Any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not limited to particular benefits, uses, or objectives. Rather, aspects of the disclosure are broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies can include various types of wireless local area networks (WLANs). A WLAN can be used to interconnect nearby devices together, employing widely used networking protocols. The various aspects described herein can apply to any communication standard, such as WiFi or, more generally, any member of the IEEE 802.11 family of wireless protocols. For example, the various aspects described herein can be used as a part of the IEEE 802.11ah protocol, which uses sub-1 GHz bands.

In some aspects, wireless signals in a sub-gigahertz band can be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol can be used for sensors, metering, and smart grid networks. Advantageously, aspects of certain devices implementing the 802.11ah protocol can consume less power than devices implementing other wireless protocols, and/or can be used to transmit wireless signals across a relatively long range, for example about one kilometer or longer.

In some implementations, a WLAN includes various devices which are the components that access the wireless network. For example, there can be two types of devices: access points ("APs") and clients (also referred to as stations, or "STAB"). In general, an AP serves as a hub or base station for the WLAN and an STA serves as a user of the WLAN. For example, an STA can be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA can also be used as an AP.

An access point ("AP") can also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" can also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As described above, certain of the devices described herein can implement the 802.11 ah standard, for example. Such devices, whether used as an STA or AP or other device, can be used for smart metering or in a smart grid network. Such devices can provide sensor applications or be used in home automation. The devices can instead or in addition be used in a healthcare context, for example for personal healthcare. They can also be used for surveillance, to enable extended-range Internet connectivity (e.g., for use with hotspots), or to implement machine-to-machine communications.

FIG. 1 illustrates an example of a wireless communication system 100 in which aspects of the present disclosure can be employed. The wireless communication system 100 can operate pursuant to a wireless standard, for example the 802.11ah standard. The wireless communication system 100 can include an AP 104, which communicates with STAs 106.

A variety of processes and methods can be used for transmissions in the wireless communication system 100 between the AP 104 and the STAs 106. For example, signals can be sent and received between the AP 104 and the STAs 106 in accordance with OFDM/OFDMA techniques. If this is the case, the wireless communication system 100 can be referred to as an OFDM/OFDMA system. Alternatively, signals can be sent and received between the AP 104 and the STAs 106 in accordance with CDMA techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel. Further, in some aspects, STAs 106 can communicate directly with each other and form a direct link (direct) between each other.

The AP 104 can act as a base station and provide wireless communication coverage in a basic service area (BSA) 102. The AP 104 along with the STAs 106 associated with the AP 104 and that use the AP 104 for communication can be referred to as a basic service set (BSS). In one aspect, the wireless communication system 100 may not have a central AP 104, but rather can function as a peer-to-peer network between the STAs 106. In another example, the functions of the AP 104 described herein can alternatively be performed by one or more of the STAs 106.

Figure 2:
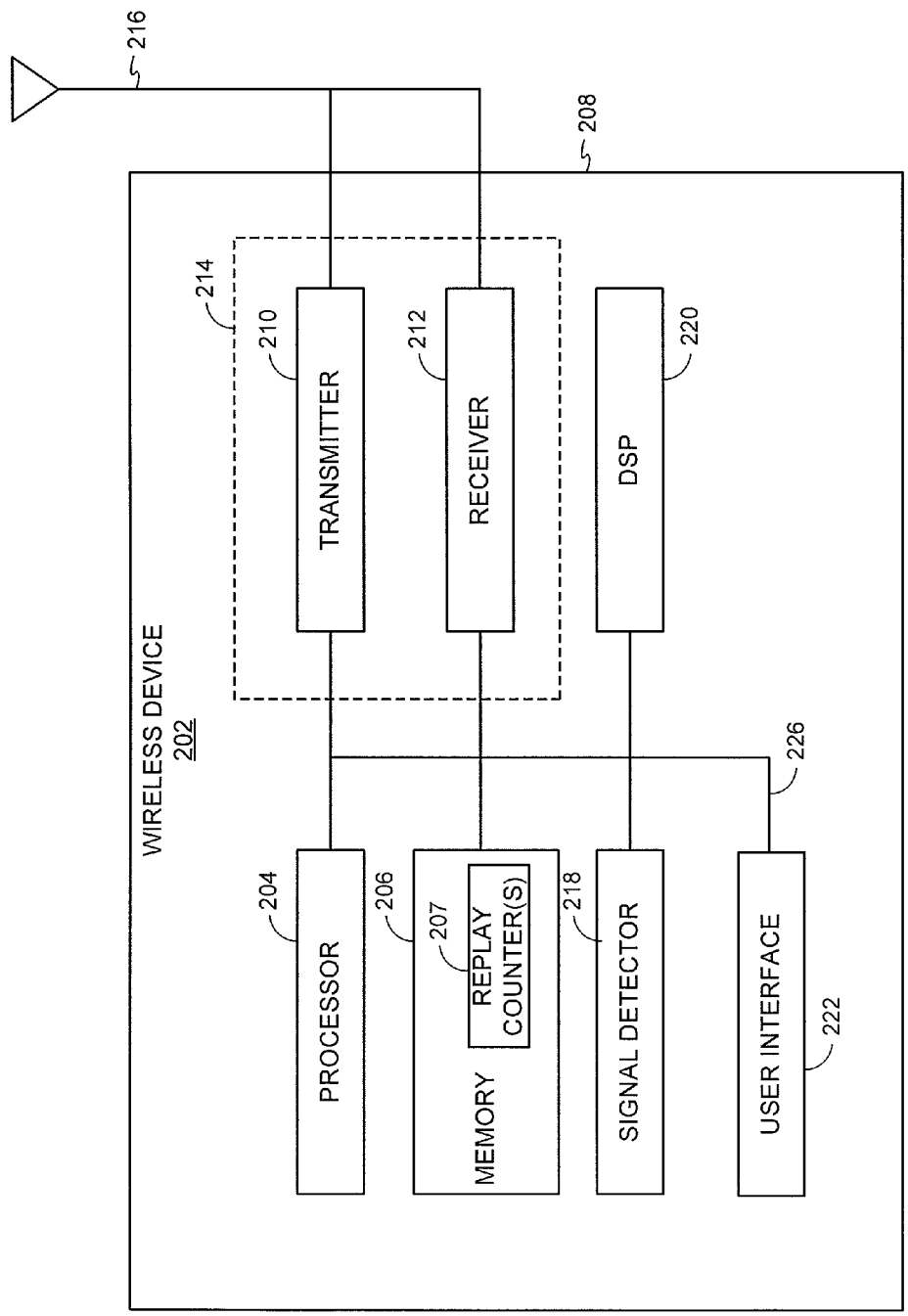
FIG. 2 illustrates various components, including a receiver, which can be utilized in a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can comprise the AP 104 or one of the STAs 106.

The wireless device 202 can include a processor 204 which controls operation of the wireless device 202. The processor 204 can also be referred to as a central processing unit (CPU). A memory 206, which can include both read-only memory (ROM) and random access memory (RAM), provides instructions and data to the processor 204. A portion of the memory 206 can also include non-volatile random access memory (NVRAM). The processor 204 may perform logical and arithmetic operations based on program instructions stored within the memory 206. The instructions in the memory 206 can be executable to implement the methods described herein.

When the wireless device 202 is implemented or used as a transmitting node, the processor 204 can be configured to select one of a plurality of medium access control (MAC) header types, and to generate a packet (e.g., an MPDU packet) having that MAC header type. For example, the processor 204 can be configured to generate an MPDU comprising a MAC header and a payload and to determine what type of MAC header to use, as described in further detail below.

When the wireless device 202 is implemented or used as a receiving node, the processor 204 can be configured to process MPDUs of a plurality of different MAC header types. For example, the processor 204 can be configured to determine the type of MAC header used in an MPDU and process the MPDU and/or fields of the MAC header accordingly as further described below.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and/or a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas.

In some embodiments, the memory 206 can be configured to store one or more separate replay counters 207 (e.g., PN replay counters) associated with different protocol versions, as described in further detail below. For example, the memory 206 can store a first set of PN replay counters 207 associated with communication in accordance with a first protocol version (e.g., PV0), which in some embodiments can be a legacy protocol version. The memory 206 can further store a second set of PN replay counters 207 associated with communication in accordance with a second protocol version (e.g., PV1), which in some embodiments can include compressed security headers.

The transmitter 210 can be configured to wirelessly transmit MPDUs having different header types, for example, MAC security header types. For example, the transmitter 210 can be configured to transmit MPDUs with different types of headers generated by the processor 204, described above. In some embodiments, the transmitter 210 can be configured to include a protocol version indication in a cryptographic nonce. In some embodiments, the transmitter 210 can be configured to transmit encrypted data using a plurality of temporal keys (TKs), each TK associated with communication in accordance with a separate protocol version.

The receiver 212 can be configured to wirelessly receive MPDUs having different security header types, for example, MAC security headers. In some aspects, the receiver 212 is configured to detect a type of a header used and process the MPDU accordingly, as described in further detail below. In some embodiments, the receiver 212 can be configured to include a protocol version indication in a cryptographic nonce. In some embodiments, the receiver 212 can be configured to receive encrypted data using a plurality of temporal keys (TKs), each TK associated with communication in accordance with a separate protocol version.

The wireless device 202 can also include a signal detector 218 that can be used in an effort to detect and quantify the level of signals received by the transceiver 214. The signal detector 218 can detect such signals as total energy, energy per subcarrier per symbol, power spectral density, and other signals. The wireless device 202 can also include a digital signal processor (DSP) 220 for use in processing signals. The DSP 220 can be configured to generate a packet for transmission. In some aspects, the packet can comprise a physical layer data unit (PPDU).

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. The components of the wireless device 202 may also be coupled together or accept or provide inputs to each other using some other mechanism.

Although a number of separate components are illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

In some aspects, the wireless device 200 in the wireless communication system 100 can implement functionality of a transmitting node (e.g., function as only a transmitting device), functionality of a receiving node (e.g., function as only a receiving device), or functionality of both a transmitting node and a receive node (e.g., function as both a transmitting and receiving device).

As described above, the wireless device 202 can comprise an AP 104 or a STA 106, and can be used to transmit and/or receive communications having a plurality of MAC header types.

In some aspects, a transmitter receiver pair (e.g., an STA transmitting to an AP over an uplink) can have several "communication flows" between them. For example, the devices in a wireless network can transmit/receive information between each other. The information can take the form of a series of MPDUs (or portions thereof, e.g., a series of MPDU packets) transmitted from a source device (the transmitting device) to a destination device (the received device). The communication of the series of MPDUs can be referred to as a "communication flow."

As referred to herein, a "communication flow" can be a series or sequence of MPDUs transmitted from a source device to a destination device that the source devices labels as a communication flow. A communication flow can be associated with transmission of particular data from the source device to a destination device, for example, a particular file such as a video file. The MPDUs of a communication flow, therefore, can share some relationship (at a minimum they are each transmitted from and received at the same devices). As described above, a communication flow can include a sequence of multiple MAC Protocol Data Units (MPDUs). The MPDUs may comprise common MAC header fields such as, for example, source address, destination address, Basic Service Set Identifier (BSSID), Quality of Service (QoS)/High Throughput (HT) control, etc. In various embodiments, the destination device uses certain information about the MPDUs to properly decode the MPDUs of a communication flow. In certain aspects, the information used to decode an MPDU is sent in a header portion of the MPDU. The MPDUs, therefore, can include header information and/or the data to be transmitted from the source device to the destination device.

In a communication flow, some of the header information described with respect to a MAC header used to process an MPDU of the communication flow can be the same for all MPDUs of the communication flow. This header information that does not change between MPDUs of a communication flow can be referred to as, for example, "constant header information" or "common header information."

In certain aspects, instead of transmitting the constant header information in each MPDU of a communication flow, the constant header information may be transmitted by the wireless device 202 in a subset of the MPDUs of a communication flow. For example, the constant header information may be transmitted in a first MPDU of the communication flow or another message. This first MPDU with the constant header information can be referred to as a "head" frame. The subsequent MPDUs of the communication flow may then be sent without the constant header information. These subsequent MPDUs can include header information that changes from MPDU to MPDU of a communication flow and the data to be transmitted. Subsequent portions of the MPDUs with such data can be referred to as "data" frames. The receiver, wireless device 202, of the communication flow can store the constant header information received in the head frame and use it to process the MPDU data frames. Accordingly, the wireless device 202 can use a method of associating the MPDU data frames of the communication flow with the head frame.

In certain aspects, the wireless device 202 assigns a communication flow identifier to each communication flow that it transmits to another device. The communication flow identifier can be a unique identifier of a communication flow between a wireless device 202 and a wireless device 202. For example, if the wireless device 202 and the wireless device 202 have multiple communication flows between each other (in either direction), each communication flow can be assigned a different communication flow identifier (e.g., 1, 2, 3, etc.). Accordingly, a device can determine if the MPDU is for the device based on the contents (e.g., values) of the a1 (315a) and a2 (320a) fields and the communication flow based on the communication flow identifier field. Each of the wireless device 202 and the wireless device 202 can keep track of the communication flows between the devices and associated communication flow identifiers so as not to assign the same communication flow identifier to multiple communication flows. Further, in certain aspects, when a communication flow is completed, as in all the data of a communication flow is transmitted between the wireless device 202 and the wireless device 202 and the communication flow is terminated, the associated communication flow identifier of the terminated communication flow can be used for a new communication flow.

Termination of a communication flow between the wireless device 202 and the wireless device 202 can be signaled to the wireless device 202 by the wireless device 202. For example, the wireless device 202 can indicate within the MPDU (e.g., in the last data frame of the MPDU) of the communication flow that includes data to send to the wireless device 202 that it is the last MPDU data frame and the communication flow is terminated after receipt of the last MPDU data frame. For example, the indication can be via the value of a bit in a frame control field of the MPDU data frame.

In another aspect, the wireless device 202 can indicate termination of a communication flow by transmitting a termination frame or "tail" frame portion of the MPDU to the wireless device 202 that indicates the communication flow should be terminated. Accordingly, the wireless device 202 can transmit the last MPDU data frame without any indication to the wireless device 202 that it is the last MPDU data frame. Further, the wireless device 202 can transmit the MPDU tail frame after the last MPDU data frame to indicate to the wireless device 202 that the communication flow is terminated.

As described above, in some aspects, the head frames, data frames, and tail frames can comprise MAC protocol data units (MPDUs). In certain aspects, multiple MPDUs can be aggregated into an aggregated-MPDU (A-MPDU). In certain aspects, the MPDU data frames of a communication flow can be transmitted as a part of the same A-MPDU. Further, in certain aspects, the head frame, data frames, and tail frame portions of the MPDUs in a communication flow can be transmitted as a part of the same A-MPDU.

As described above, the wireless device may comprise functionality of both a wireless receiver device and a wireless transmitter device. In some aspects, the wireless receiver device 202 can indicate to the wireless transmitter device 202 about information (e.g., values for fields of the MAC header) that is stored at the wireless receiver device 202. The wireless transmitter device 202 can then omit such fields from the MAC header in MPDUs sent to the wireless receiver device 202. For example, a new subtype can be defined (indicated by a value of the subtype field of the frame control field of a MAC header of an MPDU) for an MPDU that indicates it comprises information about, or is itself indicative of, the information stored at the wireless receiver device 202. A wireless transmitter device 202 receiving the MPDU with such information can then omit such information in the MAC header of MPDUs sent to the wireless receiver device 202. The new subtype frame can be used in conjunction with any of the various examples of the MAC header described herein. For example, such information can be omitted from any of the examples of MAC headers described herein. Further, the wireless transmitter device 202 can utilize the same MPDU data frame subtype (e.g., as indicated by a value of the subtype field of the frame control field of a MAC header of an MPDU) in MPDUs, thus omitting the information stored at the wireless receiver device 202 for MPDUs sent to the wireless receiver device 202. The wireless receiver device 202 receiving the MPDUs with such subtype can use the subtype as an indicator that the data stored at the wireless receiver device 202 may be used for values of fields not included in the MPDU.

Figure 3:
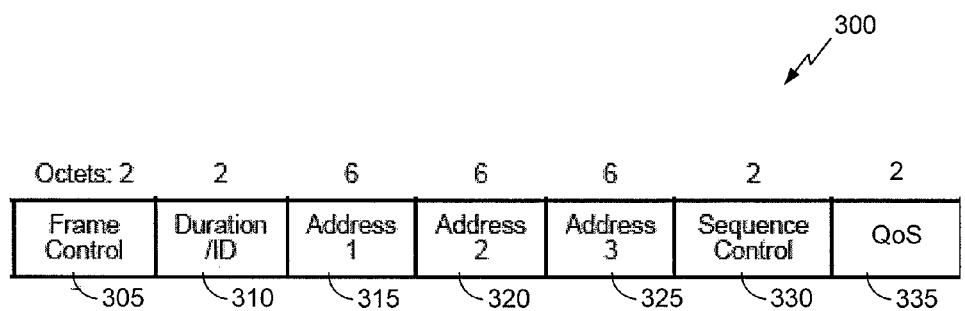
FIG. 3 illustrates an example of a medium access control (MAC) header.

FIG. 3 illustrates an example of a MAC header 300. The MAC header 300 can be a non-compressed MAC header. Although illustrated fields are shown and described herein with reference to a particular size and order, in various embodiments, fields herein can be resized, reordered, or omitted, and additional fields can be added. As shown, the MAC header 300 includes 7 different fields: a frame control (fc) field 305, a duration/identification (dur) field 310, a receiver address (a1) field 315, a transmitter address (a2) field 320, a destination address (a3) field 325, a sequence control (sc) field 330, and a quality of service (QoS) control (qc) field 335. Each of the a1, a2, and a3 fields 315-325 comprises a full MAC address of a device, which is a 48-bit (6 octet) value. FIG. 3 further indicates the size in octets of each of the fields 305-335. Summing the value of all of the field sizes gives the overall size of the MAC header 300, which is 26 octets. The total size of a given MPDU packet can be on the order of 200 octets. Therefore, the MAC header 300 comprises a large portion of the overall MPDU packet size, meaning the overhead for transmitting an MPDU is large.

FIG. 3A illustrates an example of a MAC header 300a, which is a 3-address MAC header using counter-mode with cipher block chaining message authentication code protocol (CCMP) encryption. Although illustrated fields are shown and described herein with reference to a particular size and order, in various embodiments, fields herein can be resized, reordered, or omitted, and additional fields can be added. As shown, the MAC header 300 includes 13 different fields: a frame control (fc) field 305a, a duration/identification (dur) field 310a, a receiver address (a1) field 315a, a transmitter address (a2) field 320a, a destination address (a3) field 325a, a sequence control (sc) field 330a, a quality of service (QoS) control (qc) field 335a, a high throughput (ht) control field 340a, a CCMP (ccmp) field 345a, a logical link control (LLC)/subnetwork access protocol (SNAP) (llc/snap) field 350a, a message integrity check (mic) field 360a, and a frame control sequence (fcs) field 365a.

Figure 3B:
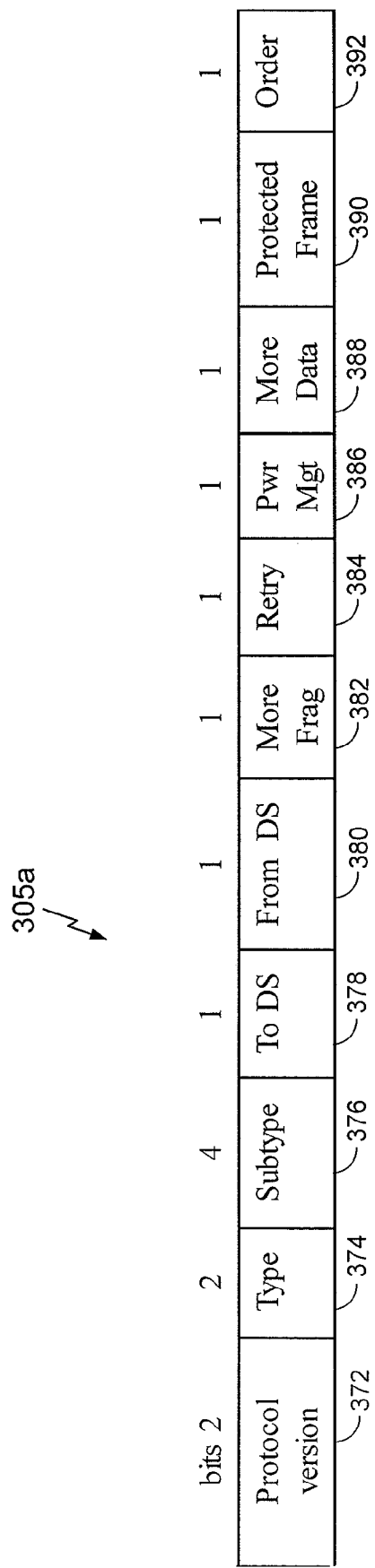
FIG. 3B illustrates an example of contents of a frame control field of a medium access control (MAC) header.

FIGS. 3A and 3B further illustrate the types of data that can be included in the fc field 305a of the MAC header 300a. For example, the fc field 305a can include the following: a protocol version (pv) sub-field 372, a frame type (type) sub-field 374, a frame subtype (subtype) sub-field 376, a to distribution system (to-ds) sub-field 378, a from distribution system (from-ds) sub-field 380, a more fragments (more frag) sub-field 382, a retry sub-field 384, a power management (pm) sub-field 386, a more data (md) sub-field 388, a protected frame (pf) sub-field 390, and an order sub-field 392. Although illustrated fields are shown and described herein with reference to a particular size and order, in various embodiments, fields herein can be resized, reordered, or omitted, and additional fields can be added.

The pv sub-field 372 can be used to indicate the protocol version of the current frame. In the 802.11 standard (e.g., up to and including 802.11ad), a protocol version (pv) sub-field of the fc field is always set to 0, since protocol version 0 (PV0) is the only defined protocol version. Accordingly, the use of other values for the protocol version, e.g., 1 (PV1), 2 (PV2), and 3 (PV3), is not defined. The systems and methods described herein can define compressed MAC headers as parts of PV1, PV2, and/or PV3. The protocol versions can be used interchangeably by devices for communication. For instance, PV0 defining use of a MAC header can be used for setting up a link, negotiating capabilities, and high speed data transfers. Further, PV1, PV2, and/or PV3 defining use of various compressed MAC header can be used for periodic short data transmissions when in power save mode.

In some embodiments, the compressed format MAC header can use the existing protocol version 0 (PV0) or the newly defined protocol version 1 (PV1), PV2, and/or PV3. The use of PV1, PV2, and/or PV3 can avoid a situation where devices attempt to parse a received MPDU based on the formatting of a PV0 frame. For example, devices can attempt to match the last 4 octets of the data packet portion of an MPDU to a frame control sequence (FCS). When it does match, the devices can use the value of the data that is in the position of the duration field to update their network allocation vector (NAV), even though there may not be a duration field at that location in the MPDU. The odds for such a false positive detection to occur can be high enough to cause glitches or jitter at some nodes, which can warrant the use of PV1, PV2, and/or PV3 for the compressed MAC header formats.

The frame type sub-field 374 is two bits in length and can be used to indicate the frame type and the function of the frame (e.g., in an MPDU). In some embodiments, the frame type sub-field 374 can indicate that the frame is a control frame, a data frame, or management frame. In some embodiments, the frame type sub-field 374 can indicate that the frame is a beacon, a PNC selection, an association request, an association response, a disassociation request, an acknowledgment, a command, etc. The subtype sub-field 376 can be used to indicate the specific function to perform for the associated frame type. There can be multiple sub-type sub-fields for each frame type. The to-ds sub-field 378 can be used to indicate whether the frame is going to be or is transmitted to a distributed system (ds). The from-ds sub-field 380 can be used to indicate whether the frame is exiting from the ds. In some embodiments, the to-ds sub-field 378 and the from-ds sub-field 380 can be used in MPDU data frame types. The more frag sub-field 382 can be used to indicate whether one or more additional fragments of the frame are to be transmitted. The retry sub-field 384 can be used to indicate whether or not the current frame is being retransmitted. For example, the retry sub-field 384 can be set to 1 in a frame that is a retransmission of an earlier frame. The power management (pm) sub-field 386 can be used to indicate a power management state. For example, the pm sub-field 386 can indicate whether an STA is in an active mode or a power-save mode. The more data (md) sub-field 388 can be used to indicate whether an additional frame is to be transmitted. For example, the md sub field 388 can be used to indicate to a receiving STA that is in power-save mode that the AP comprises more frames buffered for delivery to the STA, and thus, more frames to transmit to the STA. The protected frame (pf) sub-field 390 can be used to indicate whether frame protection is present. For example, the pf sub-field 390 can indicate whether or not encryption and/or authentication are used in the frame. In some embodiments, for frames that have encryption and authentication, the pf sub-field 390 can be set to indicate encryption is present and the subtype sub-field 376 can be set to indicate that authentication is present. The order sub-field 392 can be used to indicate order information. For example, the order sub-field 392 can be used to indicate that all received MPDU data frames are processed in order.

FIG. 3A further indicates the size in octets of each of the fields 305a-365a. Summing the value of all of the field sizes gives the overall size of the MAC header 300a, which is 58 octets. The total size of a given MPDU packet can be on the order of 200 octets. Therefore, the MAC header 300a comprises a large portion of the overall MPDU packet size, meaning the overhead for transmitting an MPDU is large.

Accordingly, systems and methods for using MAC headers of reduced size (compressed MAC headers) for MPDUs are described herein. The use of such compressed MAC headers allows for less space in an MPDU to be used by the MAC header, thereby reducing the overhead needed to transmit the payload in an MPDU. Thus, less data needs to be transmitted overall. Less transmission of data can increase the speed with which data is transmitted, can reduce the use of bandwidth by a transmitter, and can reduce the power needed for transmission as fewer resources are used to transmit less data.

Figures 4, 4A:
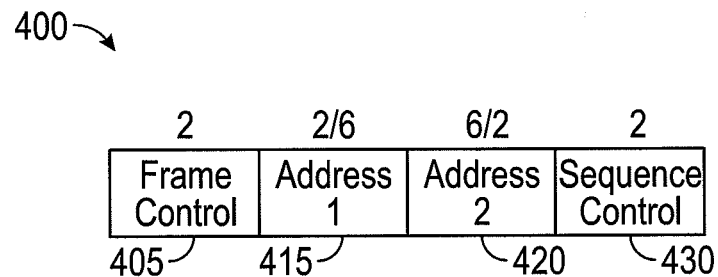
FIG. 4 illustrates an example of a compressed MAC header.
FIG. 4A illustrates examples of the type of data in the fields of the compressed MAC header of FIG. 4 for an MPDU and the data for a corresponding acknowledgement according to one aspect of the MAC header of FIG. 4.

FIG. 4 illustrates an example of a compressed MAC header 400. As shown, the MAC header 400 includes 4 different fields: a frame control (fc) field 405, a first address (a1) field 415, a second address (a2) field 420, and a sequence control (sc) field 430. FIG. 4 further indicates the size in octets of each of the fields 405-430. Although illustrated fields are shown and described herein with reference to a particular size and order, in various embodiments, fields herein can be resized, reordered, or omitted, and additional fields can be added. For example, additional address fields (e.g., a3 and/or a4) can be optionally included.

Summing the value of all of the field sizes gives the overall size of the MAC header 400, which may be 12 octets (a 54% reduction in size from the MAC header 300). As shown, one of the a1 field 415 and the a2 field 420 may be 6 octets in length, while the other may be 2 octets in length, as further described below. Optional a3 and a4 fields can be 6 octets long, in certain embodiments where they are included. The various fields of the MAC header 400 can be utilized according to several different aspects described below.

As shown in the MAC header 400, the dur field 310 can be omitted. Normally, a device receiving an MPDU decodes at least the dur field 310, which indicates a time the device should not transmit so as to avoid interfering transmissions during the transmit opportunity. Instead of the dur field 310, devices can be configured to not transmit data after receiving an MPDU that requires an acknowledgement until a time for such acknowledgement has passed. Such acknowledgement can be an ACK or BA, indicating the MPDU has been received. The devices may be configured to defer transmission until an ACK has been received for the MPDU if a field (e.g., an ACK policy field) in the MPDU indicates that the device should defer until an ACK is received. The field can be included in the MAC header or PHY header of the MPDU. In one aspect, the transmission of the response frame can be hidden for a STA that observes the MPDU causing the response frame to be sent. However, the indication in the MPDU that an ACK can be present causes the observing STA to defer after the end of the MPDU until the response frame has been transmitted by the STA that is the destination of the MPDU.

FIG. 4A illustrates examples of the type of data in the fields of the compressed MAC header 400 for an MPDU, and the data for a corresponding acknowledgement according to one aspect of the MAC header 400. As shown, in the figure, the columns labeled "Data" correspond to the information sent as a part of an MPDU (as shown, the information for the a1 field 415 and the a2 field 420 and optionally an a3 field). Although illustrated fields are shown and described herein with reference to a particular size and order, in various embodiments, fields herein can be resized, reordered, or omitted, and additional fields can be added.

The column labeled "ACK" corresponds to the information sent in a corresponding ACK. The column labeled "Direction" indicates the direction or link type over which the MPDU is sent. In some aspects, instead of using a globally unique identifier for a device (e.g., MAC address) for both the a1 field 415 and the a2 field 420 as is used in the MAC header 300, one of the a1 field 415 or the a2 field 420 may use a local identifier. A local identifier may include, for example, an access identifier (AID), which uniquely identifies a device in a particular BSS but does not necessarily uniquely identify the device globally. As shown, in one example, if the MAC header 400 is part of an MPDU transmitted over a downlink from an AP to an STA, the a1 field 415 may include a receiver AID (R-AID), and the a2 field 420 may include a BSSID.

The R-AID is the AID of the STA receiving the MPDU. The R-AID can comprise 13-bits allowing for 8192 STAs to be addressed uniquely in a given BSS by their R-AIDs. The 13-bit R-AID can allow for approximately 6000 STAs and 2192 other values, such as an indication that the MPDU is a multicast or broadcast MPDU, the type of the multicast or broadcast MPDU (e.g., a beacon), possibly in combination with a beacon change sequence number that indicates the version of the beacon that is comprised within the MPDU. The BSSID is the MAC address of the AP and can comprise 48 bits.

In some aspects, the BSSID can be replaced with a compressed version of the BSSID. For example, a compressed version of the BSSID can be an AID (e.g., 2 bytes instead of 6 bytes) which the AP can auto-assign to itself during network setup. The AID can be selected such that other APs in the area do not have the same AID. The STA receiving the MPDU with the MAC header 400 can uniquely determine whether or not it is the intended recipient of the MPDU based on the a1 field 415 and/or the a2 field 420.

In particular, the STA can check to see if the R-AID matches the R-AID of the STA. If the R-AID matches, the STA can be the intended recipient of the MPDU. This alone may not uniquely determine whether the STA is the recipient, as STAs in different BSSs can have the same R-AID. Accordingly, the STA can further check to see if the a2 field 420 includes the BSSID of the AP (e.g., BSS) that the STA is associated with. If the BSSID matches the association of the STA and the R-AID, the STA uniquely determines it is the intended recipient of the MPDU and can further process the MPDU. Otherwise, the STA can ignore the MPDU.

If the STA determines that it is the intended recipient of the MPDU, it can send an acknowledgment message (ACK) to the AP to indicate successful receipt of the MPDU. In one aspect, the STA can include all or a portion of the a2 field 420, such as a partial BSSID (pBSSID) comprising less than all of the bits of the BSSID (e.g., 13 bits) in a MAC or physical layer (PHY) header of the ACK. In some aspects, the pBSSID can be a compressed version of the BSSID. In other aspects, the compressed version of the BSSID can be a pBSSID. Accordingly, to produce the ACK, the STA may directly copy bits from the received MAC header 400, which reduces processing. The AP receiving the ACK can determine the ACK is from the STA if it is received soon after a certain time period (e.g., a short inter frame space (SIFS)) from transmission of the initial MPDU. This is because it is unlikely that the AP receives two ACKs with the same information during the same time period. In another aspect, the STA can transmit all or a portion of a cyclic redundancy check (CRC) from the MPDU or a hash of all or a portion of the MPDU in the MAC or PHY header of the ACK. The AP can determine the STA sent the ACK by checking for such information. Since such information is random for each MPDU, it is highly unlikely two ACKs with the same information will be received after the time period by the AP.

Further, the MPDU transmitted by the AP to the STA can optionally include a source address (SA) used for indicating a routing device to be used to route the MPDU. The MAC header 400 can further include a bit or field indicating whether the SA is present in the MAC header 400. In one aspect, the order bit of the frame control field of the MAC header 400 can be used to indicate presence or absence of the SA. In another aspect, two different subtypes can be defined for the compressed MAC header 400, one subtype including an a3 field such as the SA and one subtype not including the a3 field such as the SA. The subtype can be indicated via the value of a subtype field of the frame control field of the MAC header 400. In some aspects, the AP and STA can transmit information regarding the SA as a part of another MPDU and omit the SA from the MPDU. The STA can store the SA information and use it for all MPDUs sent from the AP, or for certain MPDUs that have a particular identifier associated with them (e.g., a communication flow ID) as described below.

As shown, if the MAC header 400 is part of an MPDU transmitted over an uplink from an STA to an AP, the a1 field 415 includes a BSSID of the AP and the a2 field 420 includes an AID of the STA, which can be referred to as a transmitter AID (T-AID). The AP can similarly determine whether it is the intended recipient and the transmitter of the MPDU based on the BSSID and the T-AID as described above. In particular, the AP can check to see if the BSSID matches the BSSID of the AP. If the BSSID matches, the AP is the intended recipient of the MPDU. Further, the AP can determine the transmitter of the MPDU based on the T-AID as one STA in the BSS of the AP comprises the T-AID.

If the AP determines that it is the intended recipient of the MPDU, it can send an acknowledgment message (ACK) to the STA to indicate successful receipt of the MPDU. In one aspect, the AP can include all or a portion of the a2 field 420, such as the T-AID in a MAC or physical layer (PHY) header of the ACK. Accordingly, to produce the ACK, the AP may directly copy bits from the received MAC header 400, which reduces processing. The STA receiving the ACK may determine the ACK is from the AP if the ACK is received soon after a certain time period (e.g., a short inter frame space (SIFS)) from transmission of the initial MPDU. This is because it, is unlikely that the STA receives two ACKs with the same information during the same time period. In another aspect, the AP can transmit all or a portion of a cyclic redundancy check (CRC) from the MPDU or a hash of all or a portion of the MPDU in the MAC or PHY header of the ACK. The STA can determine that the AP sent the ACK by checking for such information. Since such information is random for each MPDU, it is highly unlikely two ACKs with the same information will be received after the time period by the STA.

In some aspects, the address field of the ACK can include one or more global addresses (e.g., a MAC address, BSSID) that uniquely identifies a transmitter and/or a receiver of the ACK globally (e.g., in most networks). In some aspects, the address field can include one or more local addresses (e.g., an association identifier (AID)) that uniquely identifies a transmitter and/or a receiver of the ACK locally (e.g., in a local network such as in a particular BSS). In some aspects, the address field can include a partial or non-unique identifier (e.g., a portion of a MAC address or AID) that identifies a transmitter and/or receiver of the ACK. For example, the address field can be one of the AID, MAC address, or a portion of the AID or MAC address of the transmitter and/or receiver of the ACK that is copied from the frame being acknowledged by the ACK.

In some aspects, the identifier field of the ACK can identify the frame being acknowledged. For example, in one aspect, the identifier field can be a hash of the content of the frame. In another aspect, the identifier field can include all of or a portion of the CRC (e.g., the FCS field) of the frame. In another aspect, the identifier field can be based on all of or a portion of the CRC (e.g., the FCS field) of the frame and all or a portion of a local address (e.g., AID of an STA). In another aspect, the identifier field can be a sequence number of the frame. In another aspect, the identifier field can include one or more of the following in any combination: one or more global addresses of the transmitter/receiver of the ACK, one or more local addresses of the transmitter/receiver of the ACK, one or more portions of global addresses of the transmitter/receiver of the ACK, or one or more portions of local addresses of the transmitter/receiver of the ACK. For example, the identifier field can include a hash of a global address (e.g., BSSID, MAC address of an AP) and a local address (e.g., AID of an STA) as shown in Equation 1.

$$(\text{dec}(AID[0:8]) + \text{dec}(BSSID[44:47] \text{XOR } BSSID[40:43])2^5) \bmod 2^9 \quad \text{(Equation 1)},$$

where dec( ) is a function that converts a hexadecimal number to a decimal number. Other hash functions based on the same inputs can be implemented without departing from the scope of the disclosure.

In some aspects, the frame for which the ACK is sent in response to can include a token number set by the transmitter of the frame. The transmitter of the frame can generate the token number based on an algorithm. In some aspects, the token number generated by the transmitter can have a different value for each frame sent by the transmitter. In such aspects, the receiver of the frame can use the token number in the identifier field of the ACK to identify the frame being acknowledged such as by setting the identifier as the token number or computing the identifier based at least in part on the token number. In some aspects, the identifier field can be computed as a combination of the token number with at least one of the following: one or more global addresses of the transmitter/receiver of the ACK, one or more local addresses of the transmitter/receiver of the ACK, one or more portions of global addresses of the transmitter/receiver of the ACK, one or more portions of local addresses of the transmitter/receiver of the ACK, or all or a portion of a CRC of the frame. In some other aspects, the token number can be included in another field of the ACK and/or frame being acknowledged such as a SIG field and/or a control information (Control Info) field. In some aspects the token can be derived from a scrambling seed in a SERVICE field, which can follow a PHY preamble, of the frame being acknowledged.

By the techniques described above, the response frame (e.g., ACK, CTS, BA) can echo a value, such as a FCS or random number (e.g., packet ID), in the initiating frame (e.g., data, RTS, BAR). The echo value can be based, at least in part, on the scrambler seed. The echoed value can be transmitted in the scrambler seed field of the response frame. The echoed value can be transmitted in the SIG field of the response frame. The echoed value can be transmitted in the MPDU included in the response frame.

In some implementations, it can be desirable for the frame check sum (FCS) of the initiating frame (e.g., data, RTS, BAR) to be based on or include a random number (e.g., packet ID). This value can be used as the echo value. In such implementations, the echo value can be included in the scrambled seed of the initiating frame. Accordingly, the FCS can be echoed in full or in part in the response frame (e.g., ACK, CTS, BA).

Through the use of the echo value, by including an echo value, the response frame may not include the station identifier of the initiating frame. One or more of the addressing schemes on an initiating frame (e.g., Data, RTS, BAR, etc.) can be used with the response frame (e.g., ACK, CTS, BA, etc.) that echoes the FCS or a packet ID of the initiating frame, but not a station identifier. This can improve communications as described above.

Further, the MPDU transmitted by the STA to the AP can optionally include a destination address (DA) used for indicating a routing device to be used to route the MPDU. The MAC header 400 can further include a bit or field indicating whether the DA is present in the MAC header 400. In one aspect, the order bit or an "a3 present" bit of the frame control field of the MAC header 400 can be used to indicate a presence or an absence of the DA. In another aspect, two different subtypes can be defined for the compressed MAC header 400, one subtype including an a3 field such as the DA and one subtype not including the a3 field such as the DA. The subtype can be indicated via the value of a subtype field of the frame control field of the MAC header 400. In some aspects the values of the subtype indicating presence or omission of the DA are the same values as used to indicate the presence or the absence of the SA for DL MPDUs. In some aspects, the AP and STA can transmit information regarding the DA as a part of another MPDU and omit the DA from the MPDU. The AP can store the DA information and use it for all MPDUs sent from the STA, or for certain MPDUs that have a particular identifier associated with them (e.g., a communication flow ID).

As shown, if the MAC header 400 is part of an MPDU transmitted over a direct link from a transmitting STA to a receiving STA, the a1 field 415 includes a full receiver address (RA) of the receiving STA and the a2 field 420 includes an AID of the transmitting STA, which can be referred to as the transmitter AID (T-AID). The receiving STA can similarly determine whether it is the intended recipient and the transmitter of the MPDU based on the RA and the T-AID as described above. In particular, the receiving STA can check to see if the RA matches the RA of the receiving STA. If the RA matches, the receiving STA is the intended recipient of the MPDU. Further, the receiving STA can determine the transmitter of the MPDU based on the T-AID as one transmitting STA in the BSS of the receiving STA comprises the T-AID.

If the receiving STA determines that it is the intended recipient of the MPDU, it can send an acknowledgment message (ACK) to the transmitting STA to indicate successful receipt of the MPDU. In one aspect, the receiving STA can include all or a portion of the a2 field 420 such as the T-AID in a MAC or physical layer (PHY) header of the ACK. Accordingly, in order to produce the ACK, the receiving STA may directly copy bits from the received MAC header 400, which reduces processing. The transmitting STA receiving the ACK can determine the ACK is from the receiving STA if it is received soon after a certain time period (e.g., a short inter frame space (SIFS)) from transmission of the initial MPDU. This is because it is unlikely that the transmitting STA receives two ACKs with the same information during the same time period. In another aspect, the receiving STA can transmit all or a portion of a cyclic redundancy check (CRC) from the MPDU or a hash of all or a portion of the MPDU in the MAC or PHY header of the ACK. The transmitting STA can determine the receiving STA sent the ACK by checking for such information. Since such information is random for each MPDU, it is highly unlikely two ACKs with the same information will be received after the time period by the transmitting STA.

Whether the MPDU is sent as a part of a downlink, uplink, or direct link can be indicated by certain bits in the MAC header 400. For example, the to-distribution system (to-ds) and from-ds fields of the fc field 405 can be used to indicate the link type used for sending the MPDU (e.g., 01 for the downlink, 10 for the uplink, and 00 for the direct link), as shown in the column labeled To-DS/From-DS. Accordingly, the recipient of an MPDU can determine the length (e.g., 2 octets or 6 octets) of the a1 field 415 and a2 field 420 based on the type of address that is expected in each field and thus, determine the address contained in each field.

In another aspect, instead of indicating whether the MPDU is a part of a downlink, uplink, or direct link, 1 bit (e.g., a 1 bit substitute for the to-ds/from-ds field) can be used in the MAC header 400 to indicate which type of address is in each of the a1 field 415 and a2 field 420. For example, one value of the bit can indicate the a1 field 415 is the address of the receiver of the MPDU and the a2 field 420 is the address of the transmitter of the MPDU. The other value of the bit can indicate the a1 field 415 is the address of the transmitter of the MPDU and the a2 field 420 is the address of the receiver of the MPDU.

Compression of MAC headers can be performed by removing or modifying certain sub-fields of the frame control field of the MAC header. The compressed MAC header can then be sent from the wireless device 202 to the wireless device 202. Removal or modification of the sub-fields can be based on the information that needs to be communicated to the wireless device 202 of the MPDU. For example, the wireless device 202 may not need all the information in the frame control field 305a of the MAC header 300 to receive and process the MPDU. For example, in some cases the receiver can already have some of the information stored in memory that may be transmitted in the frame control field 305a. In one case, the wireless device 202 can have received that information in a previously received MPDU from the wireless device 202, such as in the MAC header of the previous MPDU or a messaging packet. In another case, the wireless device 202 can have such information pre-programmed, such as at the time of manufacture, or through communication with another device. In some aspects, the wireless device 202 can indicate to the wireless device 202 information (e.g., values for fields of the MAC header) that is stored at the wireless device 202. The wireless device 202 can then omit such information from the sub-fields of the frame control field, or other fields of the MAC header, in MPDUs sent to the wireless device 202.

In certain embodiments, headers can have different fields when security is enabled for the MPDU. For example, the MPDU can have a counter-mode/cbc-mac protocol (CCMP) header when security is enabled. The CCMP header can be part of the MAC header. Normally, the CCMP header includes several packet numbers (PNs) (e.g., PN0, PN1, PN2, PN3, PN4, PN5). The values of PN2, PN3, PN4, and PN5 may not change often. Accordingly, a base PN can be created based on PN2, PN3, PN4, and PN5 (e.g., PN2|PN3|PN4|PN5). The base PN can be sent as a part of a message and stored for a pair of communicating devices. The CCMP header can therefore, in one example, not include the PN2, PN3, PN4, and PN5, but only the PN0 and PN1 fields. The receiver of an MPDU can reconstruct the CCMP header by combining the base PN including the PN2, PN3, PN4, and PN5 stored at the receiver with the received PN0 and PN1 fields. In some embodiments, the security related packet number (PN) can be generated from the sequence number (SN) of the sequence control (SC) field and the base packet number (BPN). The CCMP header can be reconstructed before decoding of the MPDU as the encoding of the MPDU including any CRC type fields such as a MIC field or FCS field can be based on the full CCMP header. In various embodiments, such aspects can be referred to as "compressed security headers."

In some embodiments, compressed security headers may be employed in certain protocol versions. For example, in one aspect, compressed security headers can be employed in protocol version 1 (PV1), but not in protocol version 0 (PV0). Thus, in systems that include multiple protocol versions, PV1 MPDUs can include security PNs based on the packet SN, whereas PV0 MPDUs can include security PNs that may not be based on the packet SN. In some embodiments, the PV0 security implementation is modified to interoperate with PV1. A modified PV0 security implementation, however, may not be compatible with a legacy PV0 security implementation. Accordingly, it can be desirable to separate security implementations between protocol versions.

In one embodiment, the wireless device 202 (FIG. 2) can maintain a separate set of PN replay counters 207 for each of a plurality of protocol versions (e.g., each of the PV0 and PV1 protocol versions described above). The wireless device 202 may use a PN replay counter 207 in conjunction with a receiver to determine whether an incoming MPDU has already been received (e.g., whether the MPDU is a duplicate). For example, using the PN replay counter 207, the wireless device 202 may detect whether a value (e.g., a packet number (PN), a sequence number (SN), etc.) of an incoming MPDU matches a value (e.g., a PN, an SN, etc.) of an MPDU that has already arrived. In the event that the PN (for example) of the incoming MPDU matches the PN of the MPDU that has already arrived, then the wireless device 202 may determine that the incoming MPDU is invalid and discard the incoming MPDU. In one aspect, this process prevents replay of MPDUs by validating that the PN in the MPDU is greater than the replay counter maintained for the data session. In one aspect, the PN value associated with each MPDU may be sequentially increased with each MPDU transmission. The wireless device 202 may then discard the MPDU if it is received with a PN value that is less than or equal to the value maintained in the associated replay counter 207. In this way, the wireless device 202 may prevent interception and/or a change of an MPDU between the device transmitting the MPDU (e.g., the source device)

and the device receiving the MPDU (e.g., the destination device). As one example, if the wireless device 202 receives a first MPDU with a certain PN, the wireless device 202 may update a value of an associated PN replay counter 207. If the wireless device 202 then receives a second MPDU with a PN value that is less than or equal to the value of the associated PN replay counter 207, then the wireless device 202 may discard the second MPDU. In some aspects, this result may not be desirable if the first MPDU is a PV0 MPDU and the second MPDU is a PV1 MPDU, because they may serve different purposes being of different protocol versions. Thus, in some embodiments, rather than maintaining a single PN replay counter 207 for otherwise similar PV0 and PV1 MPDUs, the wireless device 202 may maintain one PN replay counter 207 per traffic indicator (TID) and per transmitter address (TA) for PV0 and one PN replay counter 207 per TID and per TA for PV1. Thus, in some embodiments, the wireless device 202 may not coordinate PNs (e.g., security PNs) between the two different protocol versions as further described below.

Figure 5:
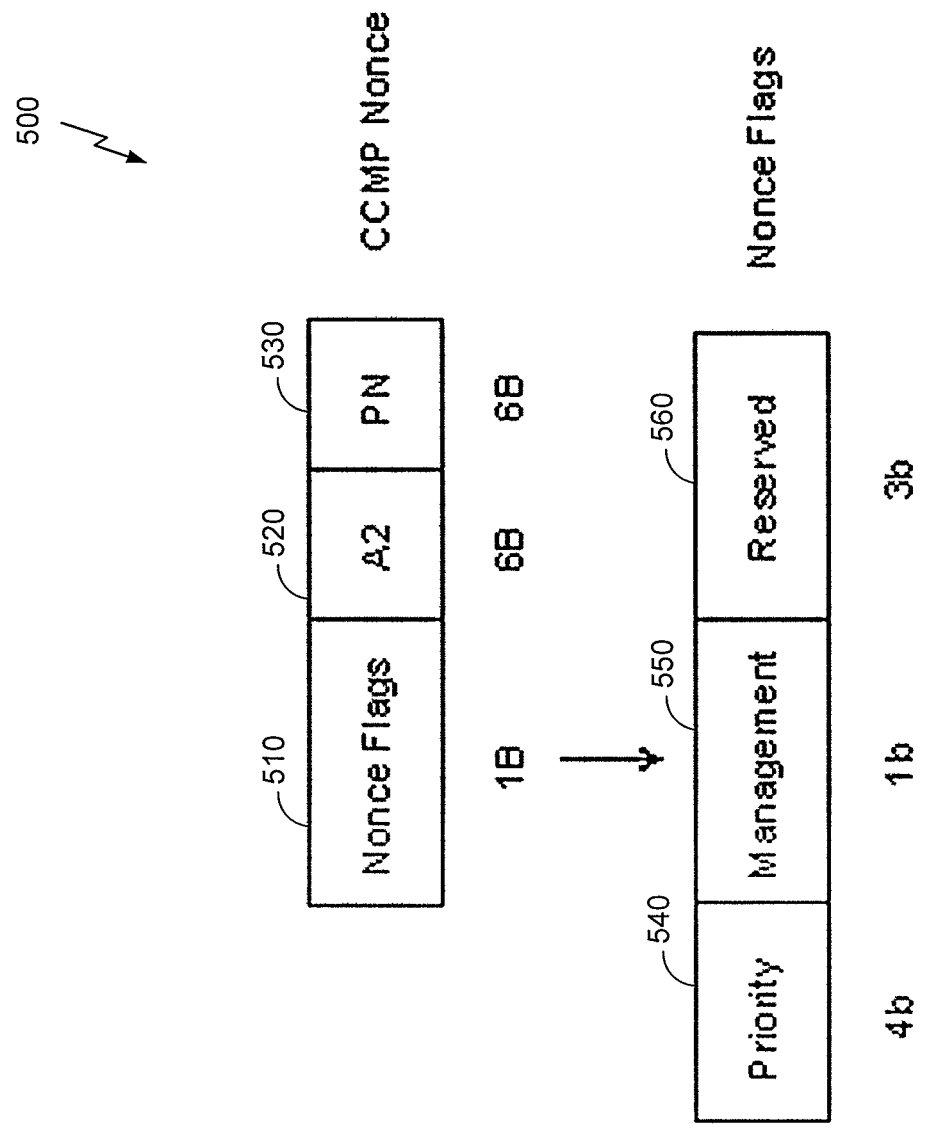
FIG. 5 illustrates a cryptographic nonce that can be used in wireless communication according to a first protocol version.
Figure 6:
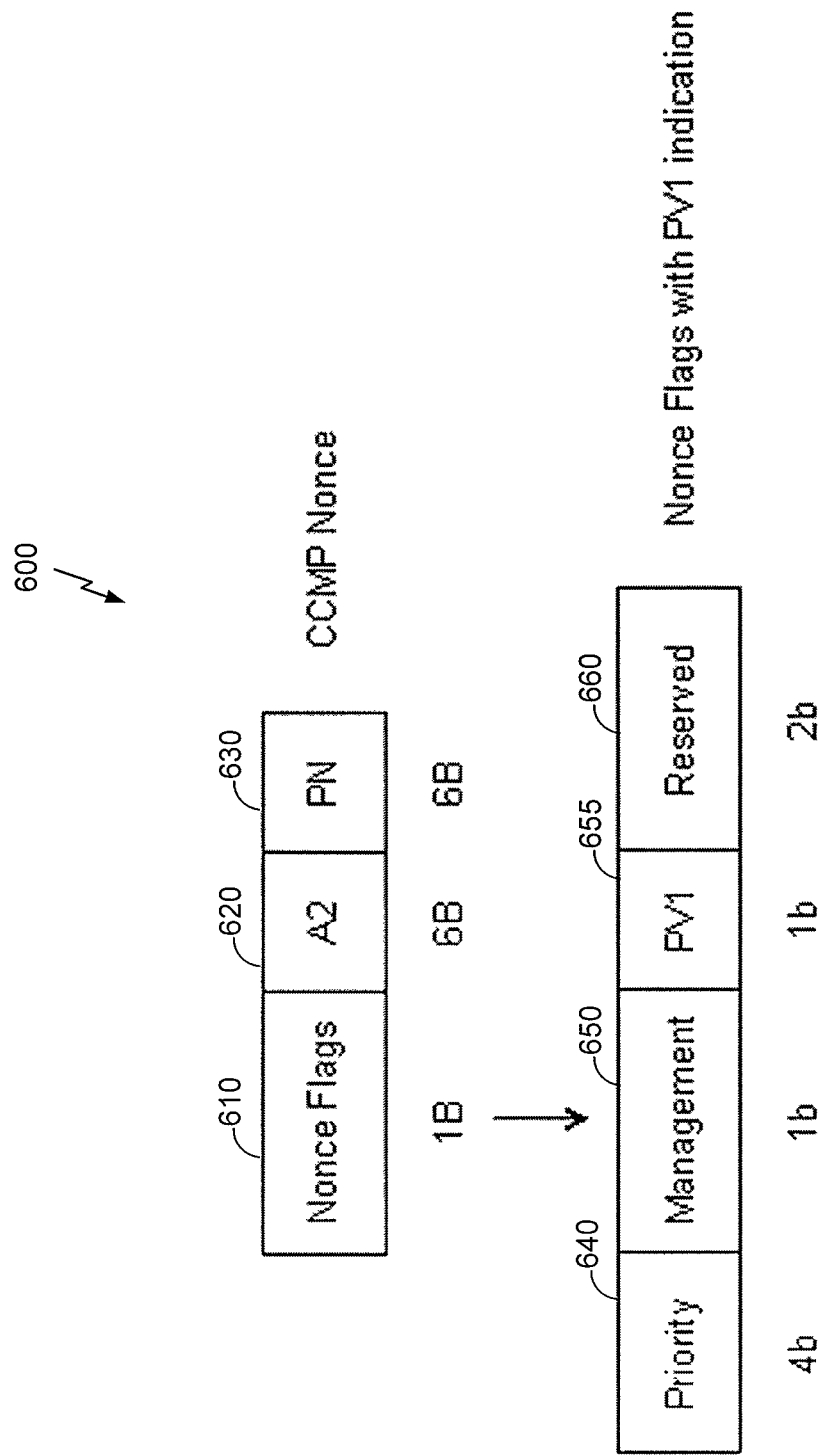
FIG. 6 illustrates a cryptographic nonce that can be used in wireless communication according to a second protocol version.

In embodiments where the wireless device 202 maintains separate sets of PN replay counters 207 for PV0 and PV1, it is possible for a PV0 MPDU to have the same PN as a PV1 MPDU. Accordingly, in legacy embodiments where the CCMP nonce is based at least in part on the PN, it is possible for the same nonce to occur twice for a given encryption key. For example, in previous systems, where the wireless device 202 may not maintain separate sets of PN replay counters 207 for PV0 and PV1, the wireless device 202 may not identify a difference between a PV0 MPDU and a PV1 MPDU sharing the same PN (e.g., or a PN lower in value). Thus, the previous systems may discard one of the MPDUs, because their matching PNs may trigger the same PN replay counter. Thus, in certain embodiments, it can be desirable to implement separate nonce formats (e.g., which may include a TID and/or a TA) for each protocol version, such that, for example, the nonce may be unique for each protocol version, even if the PN may not be unique. FIGS. 5-6 show exemplary nonce formats for PV0 and PV1 implementations, respectively.

FIG. 5 illustrates a cryptographic nonce 500 that can be used in wireless communication according to a first protocol version. The various fields described herein can be rearranged, resized, some fields can be omitted, and additional fields can be added. As shown, the nonce 500 includes nonce flags 510, an address (A2) field 520, and a packet number (PN) field 530. In the illustrated embodiment, the nonce flags 510 are one byte, the address field 520 is 6 bytes, and the PN field 530 is 6 bytes. The nonce flags include a 4-bit priority field 540, a 1-bit management flag 550, and three reserved bits 560. In an embodiment, the A2 field 520 can indicate a transmitter address of the MPDU containing the nonce.

FIG. 6 illustrates a cryptographic nonce 600 that can be used in wireless communication according to a second protocol version. The various fields described herein can be rearranged, resized, some fields can be omitted, and additional fields can be added. As shown, the nonce 600 includes nonce flags 610, an address (A2) field 620, and a packet number (PN) field 630. In the illustrated embodiment, the nonce flags 610 are one byte, the address field 620 is 6 bytes, and the PN field 630 is 6 bytes. The nonce flags include a 4-bit priority field 640, a 1-bit management flag 650, a 1-bit protocol version indication 655, and two reserved bits 660. In an embodiment, the A2 field 520 can indicate a transmitter address of the MPDU containing the nonce.

In various embodiments, the protocol version indication 655 can indicate a protocol version of the nonce 600. For example, the protocol version indication 655 can be a flag that, when set, indicates that the MPDU is transmitted using PV1, and when not set, indicates that the MPDU is transmitted using a protocol version that is not PV1. In another embodiment, the protocol version indication 655 can be a flag that, when set, indicates that the MPDU is transmitted using a protocol version that is not PV0, and when not set indicates that the MPDU is transmitted using PV0. In other embodiments, the protocol version indication 655 can include additional bits that can indicate a specific protocol version used.

In other embodiments, both PV0 and PV1 can use the same nonce format. In some embodiments, the wireless device 202 can derive a separate encryption key for a plurality of protocol versions. For example, the wireless device 202 can derive separate transient keys (TKs) for PV0 MPDUs and PV1 MPDUs, respectively. Accordingly, although the same nonce value can occasionally be generated for both PV0 and PV1 transmissions, the separate encryption keys can ensure nonce uniqueness for a given security key.

Figure 7:
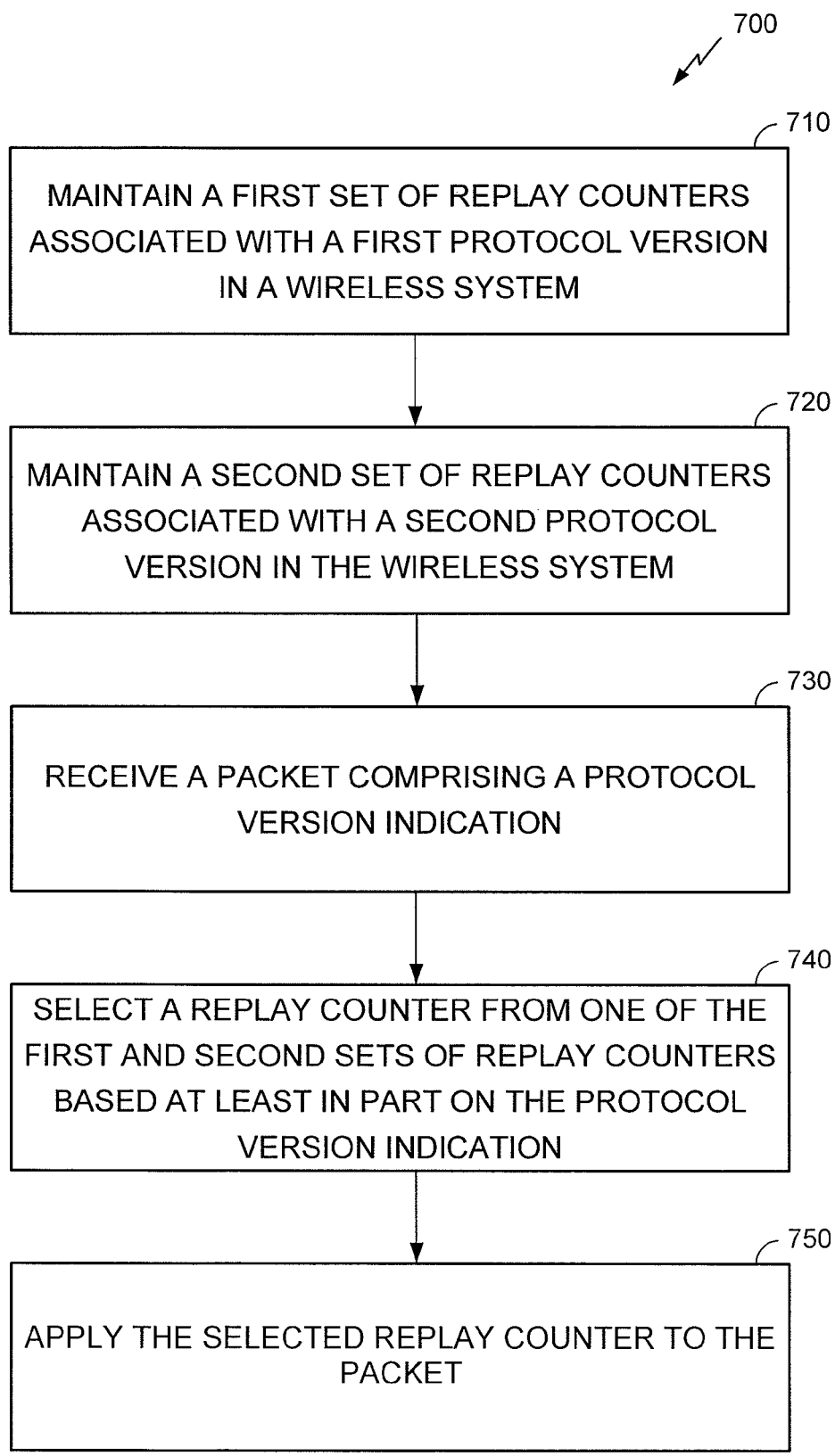
FIG. 7 shows a flowchart for an exemplary method of wireless communication that can be employed within the wireless communication system of FIG. 1.

FIG. 7 shows a flowchart 700 for an exemplary method of wireless communication that can be employed within the wireless communication system 100 of FIG. 1. The method can be implemented in whole or in part by the devices described herein, such as the wireless device 202 shown in FIG. 2. Although the illustrated method is described herein with reference to the wireless communication system 100 described above with respect to FIG. 1, and the wireless device 202 described above with respect to FIG. 2, the illustrated method can be implemented by another device described herein, or any other suitable device. Although the illustrated method is described herein with reference to a particular order, in various embodiments, blocks herein can be performed in a different order, or omitted, and additional blocks can be added.

First, at block 710, the device 202 receives an MPDU comprising an indication of a communication in accordance with a protocol version. The MPDU can include one or more of the headers and/or fields described herein. For example, the receiver 212 can receive a PV0 or PV1 MPDU as described herein.

In various embodiments, the first and second sets of PN replay counters can each include at least one PN replay counter per traffic indicator and per transmitter address. Furthermore, the device 202 can maintain (e.g., in the memory 206) the first and second sets of replay counters associated with communication in accordance with a first and second protocol version, respectively. The processor 204 can use the PN replay counters to determine whether a newly received PV0 MPDU comprises a valid (e.g., unique) packet number within the specific packet number space to which the MPDU belongs.

In various embodiments, the MPDU can include a first security header having a first length when the protocol version indication indicates the first protocol version. For example, a PV0 MPDU can include a regular MAC header and/or a MAC security header as described above (e.g., the header 300 described above with respect to FIG. 3).

In various embodiments, the MPDU can include a second security header having a second length, smaller than the first length, when the protocol version indication indicates the second protocol version. For example, a PV1 MPDU can include a shortened MAC header and/or compressed security header as described herein (e.g., the header 400 described above with respect to FIG. 4). In one aspect, the shortened MAC header and/or compressed security header of the PV1 MPDU can comprise zero bytes (e.g., be absent).

In various embodiments, the device 202 can generate, based on the received MPDU, a nonce comprising the indication of the communication in accordance with the protocol version. For example, the processor 204 can generate the nonce 500, described above with respect to FIG. 5, for a PV0 MPDU. The processor 204 can generate the nonce 600, described above with respect to FIG. 6, for a PV1 MPDU.

In various embodiments, the nonce can include one or more of: a four-bit priority field, a one-bit management field, a one-bit protocol indication flag, a six-byte transmitter address field, and a six-byte packet number field. In various embodiments, the one-bit protocol indication flag can indicate a particular (e.g., the second) protocol version when set. Thus, in certain embodiments, the nonce can include the nonce 600 described above with respect to FIG. 6. In some embodiments, the second protocol version can be the PV1 protocol version.

Subsequently, at block 720, the device 202 selects a PN replay counter from one of the first and second sets of PN replay counters based at least in part on the protocol version indication. For example, the processor 204 can determine whether the MPDU is a PV0 or a PV1 MPDU based on the MPDU indication (such as the protocol version field 372 in the frame control field 305a, described above with respect to FIG. 3A). The processor 204 can select the set of PN replay counters associated with communication in accordance with the protocol version of the MPDU.

Thereafter, at block 730, the device 202 processes the received MAC protocol data unit in accordance with the selected replay counter. For example, the processor 204 can retrieve the selected PN replay counter from the memory 206. In various embodiments, processing the received MAC protocol data unit in accordance with the selected replay counter can include selectively discarding the MPDU based on whether a packet number (PN) of the packet is less than or equal to a value maintained at the PN replay counter. For example, the processor 204 can discard the MPDU when the PN of the MPDU is equal to or less (or older) than the value maintained at the selected PN replay counter.

In various embodiments, the device 202 can derive a first encryption key associated with communication in accordance with the first protocol version and a second encryption key associated with communication in accordance with the second protocol version. For example, the processor 204 can generate separate encryption keys for PV0 and PV1, as described above.

In various embodiments, the device 202 can decode a portion of the MPDU using the first encryption key when the protocol version indication indicates the first protocol version. The device 202 can decode a portion of the MPDU using the second encryption key when the protocol version indication indicates the second protocol version. For example, the processor 204 can determine whether the MPDU is a PV0 MPDU or a PV1 MPDU (such as the protocol version field 372 in the frame control field 305a, described above with respect to FIG. 3A). The processor 204 can apply the associated encryption key based on the protocol version of the MPDU. In various embodiments, the first and second encryption keys can include temporal keys.

In an embodiment, the method shown in FIG. 7 can be implemented in a wireless device that can include a maintaining circuit, a receiving circuit, a selecting circuit, and an applying circuit. A wireless device can have more components than the simplified wireless device described herein.

The wireless device described herein includes those components useful for describing some prominent features of implementations within the scope of the claims.

The maintaining circuit can be configured to maintain the first and second sets of PN replay counters (e.g., the replay counters 207 of FIG. 2). The maintaining circuit can be configured to perform at least blocks 710 and/or 720 of FIG. 7. The maintaining circuit can include one or more of the processor 204 (FIG. 2), the memory 206 (FIG. 2), the receiver 212 (FIG. 2), the antenna 216 (FIG. 2), and the transceiver 214 (FIG. 2). In some implementations, means for maintaining can include the maintaining circuit.

The receiving circuit can be configured to receive the MPDU. The receiving circuit can be configured to perform at least block 730 of FIG. 7. The receiving circuit can include one or more of the receiver 212 (FIG. 2), the antenna 216 (FIG. 2), and the transceiver 214 (FIG. 2). In some implementations, means for receiving can include the receiving circuit.

The selecting circuit can be configured to select the PN replay counter. The selecting circuit can be configured to perform at least block 740 of FIG. 7. The selecting circuit can include one or more of the processor 204 (FIG. 2) and the memory 206 (FIG. 2). In some implementations, means for selecting can include the selecting circuit.

The applying circuit can be configured to apply the selected PN replay counter to the MPDU, for example, to process the received MAC protocol data unit in accordance with the selected replay counter. The applying circuit can be configured to perform at least block 750 of FIG. 7. The applying circuit can include one or more of the processor 204 (FIG. 2) and the memory 206 (FIG. 2). In some implementations, means for applying or processing can include the applying circuit.

As used herein, the term "determining" encompasses a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like. Further, a "channel width" as used herein can encompass or can also be referred to as a bandwidth in certain aspects.

As used herein, a phrase referring to "at least one of" a list of items refers to any combination of those items, including single members. As an example, "at least one of: a, b, or c" includes: a, b, c, a-b, a-c, b-c, and a-b-c.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (e.g., tangible media). In addition, in some aspects computer readable medium can comprise transitory computer readable medium (e.g., a signal). Combinations of the above may also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

The functions described can be implemented in hardware, software, firmware or any combination thereof. If implemented in software, the functions can be stored as one or more instructions on a computer-readable medium. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects can comprise a computer program product for performing the operations presented herein. For example, such a computer program product can comprise a computer readable medium having instructions stored (and/ or encoded) thereon, the instructions being executable by one or more processors to perform the operations described herein. For certain aspects, the computer program product can include packaging material.

Software or instructions can also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The claims are not limited to the precise configuration and components illustrated above. Various modifications, changes and variations can be made in the arrangement, operation and details of the methods and apparatus described above without departing from the scope of the claims.

While the foregoing is directed to aspects of the present disclosure, other and further aspects of the disclosure can be devised without departing from the basic scope thereof, and the scope thereof is determined by the claims that follow.

What is claimed is:

1. A method of processing a media access control (MAC) protocol data unit in a wireless system, comprising:
 receiving the MAC protocol data unit, the MAC protocol data unit comprising an indication of a communication in accordance with a protocol version;
 selecting a replay counter from one of a first and second sets of replay counters based at least in part on the indication;
 generating, based on the received MAC protocol data unit, a nonce comprising the indication of the communication in accordance with the protocol version; and
 processing the received MAC protocol data unit in accordance with the selected replay counter.

2. The method of claim 1, wherein the first and second sets of replay counters each comprise one replay counter per each of a traffic indicator and a transmitter address.

3. The method of claim 1, wherein processing the received MAC protocol data unit comprises selectively discarding the MAC protocol data unit based on whether a packet number of the MAC protocol data unit is less than or equal to a value maintained at the selected replay counter.

4. The method of claim 1, wherein:
 the MAC protocol data unit further comprises a first security header having a first length when the protocol version indicates the first protocol version; and
 the MAC protocol data unit further comprises a second security header having a second length, the second length being smaller than the first length, when the protocol version indicates the second protocol version.

5. The method of claim 1, wherein the nonce comprises one or more of: a four-bit priority field, a one-bit management field, a one-bit protocol indication flag, a six-byte transmitter address field, and a six-byte packet number field.

6. The method of claim 5, wherein the one-bit protocol indication flag indicates a particular protocol version when set.

7. The method of claim 1, further comprising:
maintaining the first and second sets of replay counters associated with communication in accordance with a first and second protocol version, respectively; and
deriving a first encryption key associated with communication in accordance with the first protocol version and a second encryption key associated with communication in accordance with the second protocol version.

8. The method of claim 7, further comprising:
decoding a first portion of the MAC protocol data unit using the first encryption key when the protocol version indication indicates the first protocol version; and
decoding a second portion of the MAC protocol data unit using the second encryption key when the protocol version indication indicates the second protocol version.

9. The method of claim 7, wherein the first and second encryption keys comprise temporal keys.

10. The method of claim 7, wherein the MAC protocol data unit comprises a packet number, the packet number being based at least in part on a stored packet number information associated with the MAC protocol data unit when the protocol version indication indicates the first protocol version, and the packet number being based at least in part on a sequence number of the MAC protocol data unit when the protocol version indication indicates the second protocol version.

11. A wireless device configured to process a media access control (MAC) protocol data unit in a wireless system, comprising:
a receiver configured to receive the MAC protocol data unit, the MAC protocol data unit comprising an indication of a communication in accordance with a protocol version; and
a processor configured to:
select a replay counter from one of a first and second sets of replay counters based at least in part on the indication;
generate, based on the received MAC protocol data unit, a nonce comprising the indication of the communication in accordance with the protocol version; and
process the received MAC protocol data unit in accordance with the selected replay counter.

12. The wireless device of claim 11, wherein the first and second sets of replay counters each comprise one replay counter per each of a traffic indicator and a transmitter address.

13. The wireless device of claim 11, wherein the processor is further configured to process the received MAC protocol data unit by selectively discarding the MAC protocol data unit based on whether a packet number of the MAC protocol data unit is less than or equal to a value maintained at the selected replay counter.

14. The wireless device of claim 11, wherein:
the MAC protocol data unit further comprises a first security header having a first length when the protocol version indicates the first protocol version; and
the MAC protocol data unit further comprises a second security header having a second length, the second length being smaller than the first length, when the protocol version indicates the second protocol version.

15. The wireless device of claim 11, wherein the nonce comprises one or more of: a four-bit priority field, a one-bit management field, a one-bit protocol indication flag, a six-byte transmitter address field, and a six-byte packet number field.

16. The wireless device of claim 15, wherein the one-bit protocol indication flag indicates a particular protocol version when set.

17. The wireless device of claim 11, wherein the processor is further configured to:
maintain the first and second sets of replay counters associated with communication in accordance with a first and second protocol version, respectively; and
derive a first encryption key associated with communication in accordance with the first protocol version and a second encryption key associated with communication in accordance with the second protocol version.

18. The wireless device of claim 17, wherein the processor is further configured to:
decode a first portion of the MAC protocol data unit using the first encryption key when the protocol version indication indicates the first protocol version; and
decode a second portion of the MAC protocol data unit using the second encryption key when the protocol version indication indicates the second protocol version.

19. The wireless device of claim 17, wherein the first and second encryption keys comprise temporal keys.

20. An apparatus for processing a media access control (MAC) protocol data unit in a wireless system, comprising:
means for receiving the MAC protocol data unit, the MAC protocol data unit comprising an indication of a communication in accordance with a protocol version;
means for selecting a replay counter from one of a first and second sets of replay counters based at least in part on the indication;
means for generating, based on the received MAC protocol data unit, a nonce comprising the indication of the communication in accordance with the protocol version; and
means for processing the received MAC protocol data unit in accordance with the selected replay counter.

21. The apparatus of claim 20, wherein the first and second sets of replay counters each comprise one replay counter per each of a traffic indicator and a transmitter address.

22. The apparatus of claim 20, wherein the means for processing the received MAC protocol data unit comprises means for selectively discarding the MAC protocol data unit based on whether a packet number of the MAC protocol data unit is less than or equal to a value maintained at the selected replay counter.

23. The method of claim 20, further comprising, means for maintaining the first and second sets of replay counters associated with communication in accordance with a first and second protocol version, respectively, and wherein:
the MAC protocol data unit further comprises a first security header having a first length when the protocol version indicates the first protocol version; and
the MAC protocol data unit further comprises a second security header having a second length, the second length being smaller than the first length, when the protocol version indicates the second protocol version.

24. A non-transitory computer-readable medium comprising code that, when executed by one or more processors, causes an apparatus to:
- receive a media access control (MAC) protocol data unit, the MAC protocol data unit comprising an indication of a communication in accordance with a protocol version;
- select a replay counter from one of a first and second sets of replay counters based at least in part on the indication;
- generate, based on the received MAC protocol data unit, a nonce comprising the indication of the communication in accordance with the protocol version; and
- process the received MAC protocol data unit in accordance with the selected replay counter.

25. The medium of claim 24, wherein the first and second sets of replay counters each comprise one replay counter per each of a traffic indicator and a transmitter address.

26. The medium of claim 24, further comprising code that, when executed by one or more processors, causes the apparatus to process the received MAC protocol data unit by selectively discarding the MAC protocol data unit based on whether a packet number of the MAC protocol data unit is less than or equal to a value maintained at the selected replay counter.

27. The medium of claim 24, further comprising code that, when executed by one or more processors, causes the apparatus to maintain the first and second sets of replay counters associated with communication in accordance with a first and second protocol version, respectively, and wherein:
- the MAC protocol data unit further comprises a first security header having a first length when the protocol version indicates the first protocol version; and
- the MAC protocol data unit further comprises a second security header having a second length, the second length being smaller than the first length, when the protocol version indicates the second protocol version.

* * * * *